US008086500B2

(12) United States Patent
Lutnick et al.

(10) Patent No.: US 8,086,500 B2
(45) Date of Patent: Dec. 27, 2011

(54) INTERACTIVE ASSISTANCE ON PURCHASE DECISION-MAKING

(75) Inventors: Howard W Lutnick, New York, NY (US); Glenn D Kirwin, Scarsdale, NY (US); Joan Kirwin, legal representative, Scarsdale, NY (US)

(73) Assignee: CFPH, LLC, New York, NY (US)

( * ) Notice: Subject to any disclaimer, the term of this patent is extended or adjusted under 35 U.S.C. 154(b) by 162 days.

(21) Appl. No.: 11/261,844

(22) Filed: Oct. 28, 2005

(65) Prior Publication Data

US 2006/0085286 A1    Apr. 20, 2006

Related U.S. Application Data

(63) Continuation of application No. 09/941,901, filed on Aug. 28, 2001, now abandoned.

(51) Int. Cl.
G06Q 30/00       (2006.01)
(52) U.S. Cl. .................. 705/26.4; 705/26.1; 705/26.7
(58) Field of Classification Search ............ 705/26.1, 705/26.4, 26.7
See application file for complete search history.

(56) References Cited

U.S. PATENT DOCUMENTS

| | | | |
|---|---|---|---|
| 4,992,940 A | | 2/1991 | Dworkin |
| 5,732,397 A | | 3/1998 | DeTore et al. |
| 5,732,398 A | * | 3/1998 | Tagawa ............................. 705/5 |
| 5,754,850 A | | 5/1998 | Janssen ....................... 707/104.1 |
| 5,948,040 A | * | 9/1999 | DeLorme et al. .............. 701/201 |
| 6,012,051 A | | 1/2000 | Sammon, Jr. et al. |
| 6,018,715 A | * | 1/2000 | Lynch et al. ....................... 705/5 |
| 6,085,176 A | | 7/2000 | Woolston |
| 6,119,101 A | | 9/2000 | Peckover |
| 6,304,850 B1 | * | 10/2001 | Keller et al. ....................... 705/5 |
| 6,381,597 B1 | | 4/2002 | Lin |
| 6,412,012 B1 | * | 6/2002 | Bieganski et al. ............ 709/232 |
| 6,421,691 B1 | | 7/2002 | Kajitani |
| 6,553,346 B1 | * | 4/2003 | Walker et al. ....................... 705/1 |
| 6,802,042 B2 | | 10/2004 | Rangan et al. |
| 6,873,967 B1 | * | 3/2005 | Kalagnanam et al. .......... 705/26 |
| 7,006,980 B1 | * | 2/2006 | Snyder ............................ 705/10 |
| 2002/0052873 A1 | * | 5/2002 | Delgado et al. .................... 707/7 |
| 2002/0077871 A1 | * | 6/2002 | Udelhoven et al. .............. 705/5 |
| 2002/0091535 A1 | * | 7/2002 | Kendall et al. .................... 705/1 |
| 2002/0095329 A1 | * | 7/2002 | Malik et al. ..................... 705/10 |

(Continued)

FOREIGN PATENT DOCUMENTS

WO    WO 00/46651    8/2000

(Continued)

OTHER PUBLICATIONS

Business/Technology Editors. (Apr 16.). iPhrase's One Step Commerce Solution to Enhance Customer Experience on CNET. Business Wire,1. Retrieved Aug. 12, 2011, from Business Dateline. (Document ID: 71349642).*

(Continued)

Primary Examiner — Scott Zare
(74) Attorney, Agent, or Firm — David E. Boundy

(57) ABSTRACT

Systems and methods for providing interactive assistance on purchase decision-making are provided. These systems and methods are preferably adapted to enable a purchase decision to be made by preferably interactively assisting the purchase decision-making process until a final purchase selection is made or indicated.

19 Claims, 5 Drawing Sheets

U.S. PATENT DOCUMENTS

2002/0113809 A1    8/2002  Akazawa et al.
2002/0174003 A1*  11/2002  Redmann et al. .................. 705/8
2004/0249723 A1*  12/2004  Mayer .............................. 705/26
2005/0119980 A1*   6/2005  Kohavi et al. .................... 705/80
2006/0259335 A1*  11/2006  La Macchia et al. ............. 705/6

FOREIGN PATENT DOCUMENTS

WO    WO 01/24039  A2    4/2001
WO    WO 01/46841  A2    6/2001

OTHER PUBLICATIONS

Quicken.com, Intuit Inc., at http://quicken.com/welcome/(printed Mar. 19, 2001).

Autobytel.com, Autobytel.com, Inc., at http://www.autobytel.com/ (printed Mar. 19, 2001).

Quicken.com, Intuit, Inc., at http://quicken.com/shopping/ (printed Mar. 19, 2001).

SmartMoney.com, SmartMoney, at http://smartmoney.com/oneasset/ (printed Mar. 19, 2001).

\* cited by examiner

INTERACTIVE ASSISTANCE ON PURCHASE DECISION-MAKING

CROSS-REFERENCE TO RELATED APPLICATION

This application is a continuation of U.S. patent application Ser. No. 09/941,901 filed Aug. 28, 2001, which is hereby incorporated by reference herein in its entirety.

BACKGROUND OF THE INVENTION

The present invention relates to systems and methods for providing interactive assistance with purchase decision-making. More particularly, the present invention relates to systems and methods for enabling users to make purchase decisions by offering step-by-step interactive assistance.

Purchasing decisions can benefit from a structured approach. In particular, a person with a sudden influx of cash—receiving an unexpected bonus, winning a lottery, or inheriting a fortune from a wealthy relative—may experience a difficulty in deciding how to spend the money. Such a person may engage in impulsive spending and squander the money. Careful financial planning is beneficial to ensure that the spender receives the maximum benefit from the money.

The spender may need the outside assistance most when purchasing goods or services, because the purchase decision-making may involve processing a large amount of information. For example, the spender may have to first choose a purchase category—e.g., shopping, travel, invest, etc. Under each category, there may be numerous subcategories, brands, options, or choices for the spender to choose from, each with a further list of countless smaller sub-subcategories, etc.

The purchase decision-making process may further involve comparisons between these numerous different purchase categories and subcategories, their prices and distinct features. It may also involve comparisons between different sellers and service providers.

As the purchase decision-making process progresses toward a final selection by the spender, information on the spender's personal preference in increasingly greater detail may need to be incorporated into the process. Ideally, the purchase decision-making process should be able to take into account the fine details of the spender's personal preference as much as possible. Simultaneously, it should also be able to look up and compare as many purchase categories/subcategories and sellers/service providers as possible.

In view of the foregoing, it would be desirable to provide systems and methods for providing interactive assistance to a spender on his or her purchase decision-making based on input and information from both the spender and sellers/service providers.

SUMMARY OF THE INVENTION

It is an object of the present invention to provide systems and methods for providing interactive assistance on purchase decision-making. More particularly, the present invention relates to systems and methods for enabling users to make purchase decisions by offering step-by-step interactive assistance.

In accordance with this and other objects of the invention, there are provided systems and methods of providing interactive assistance on purchase decision-making. Initially, assistance may be requested from an assistance provider ("interactive purchasing system" or "the system") by entering preliminary data. The preliminary data preferably include the amount of total spending money available to the user. The preliminary data may include any other information (e.g., demographic data) necessary to initiate the interactive assistance process of the system.

After the system gathers the preliminary data, it may then present a selectable list of purchase categories and questions relating to the user's personal preference. The responses at each level may determine the system's subsequent selection of questions and/or purchase subcategories presented. Preferably, the interactive question-and-answer process between the system and the user is designed to narrow down the purchase choices to a single or finite number of definite purchasable items/services.

For example, the system may start the interactive assistance process by presenting broad purchase categories to select (e.g., shopping, investing, traveling, etc.). Based on user's selection, the system may ask for user's personal preference. Building on user's responses that the system has obtained so far, the system may then present narrower subcategories for the user to select. As the process progresses, selections of purchase subcategories and questions on user's preference presented by the system may become progressively more focused and detailed. This interactive question-and-answer process may continue until a final purchase selection is made. At any point, the process may be aborted or returned to an earlier part of the process in order to modify selections or responses.

At any point during the interactive assistance process, the system may contact and receive necessary data (e.g., price, availability, selections, etc.) from a seller/service provider or a predetermined group of sellers/service providers within a selected purchase category. The system may use data from the sellers/service providers to make a purchase recommendation. The system may be capable of comparing different items/services and different sellers/service providers based on price and/or any other suitable criteria chosen by the user and/or the system.

The system may be capable of calculating purchase cost when a final purchase selection is made. The system may also be capable of comparing the purchase cost with the total spending money available. The system may be capable of handling and keeping track of multiple purchase selections and their cost. The system may permit as many purchase selections as desired so long as the total purchase cost incurred does not go beyond the total spending money available.

When the interactive assistance process is complete, the system may finalize purchase transactions between the user and sellers/service providers of the selected purchase item(s)/service(s). The system may provide a summary of all purchase selections and purchase cost.

As will be apparent upon reading the Detailed Description of the Preferred Embodiments, various features of the present invention may be implemented with any type of interactive purchasing system for the purchase of any type of item or service. For example, the invention may be used with a system for purchase of consumer products, real estate, investment vehicles, travel package, and hospitality service.

Furthermore, the present invention may be implemented to provide interactive assistance on any other type of money-spending activity besides the purchase of goods or services. For example, the present invention may be implemented to provide interactive assistance to a person to choose a charitable organization or a class of beneficiaries to whom the person would like to donate the money.

In a method according to the invention, a method for interactively assisting purchase decision-making is provided. The method may preferably include receiving data relating to purchasing options. The options including shopping and investing. The method may also include querying based on the data, receiving a response to the querying, and, finally guiding purchase decision-making based on the data and the response until a final purchase selection is indicated or made.

BRIEF DESCRIPTION OF THE DRAWINGS

Further features of the invention, its nature and numerous advantages will be more apparent from the following detailed description of the preferred embodiments, taken in conjunction with the accompanying drawings, in which like reference characters refer to like parts throughout, and in which.

DETAILED DESCRIPTION OF THE PREFERRED EMBODIMENTS

The present invention is now described in connection with FIGS. 1-4.

Figure 1:
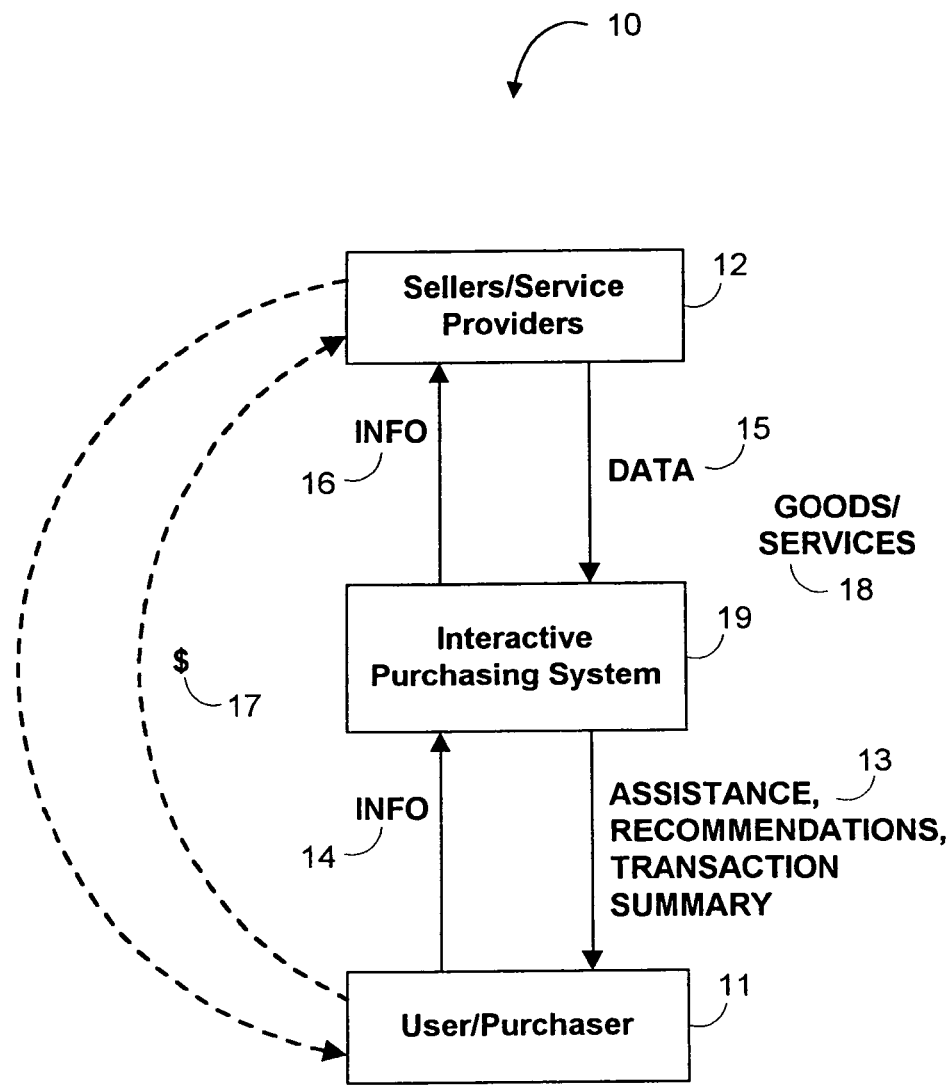
FIG. 1 is a transaction flow diagram of one embodiment of the systems and methods of the present invention.

Turning first to FIG. 1, an example of a transaction flow 10 of one embodiment of the systems and methods of the present invention is illustrated. An interactive purchase system 19 may provide an interface for a user 11 to enter data or responses. As shown, user 11 may request assistance with his or her purchase decision-making by submitting preliminary data at box 14 to interactive purchasing system 19. Preferably, the preliminary data include the total amount of spending money available to the user. The preliminary data may further include demographic data such as age and gender, the user's present income, or credit/loan history. The preliminary data may comprise any suitable and relevant information that may prove useful for the purchase decision-making process.

Upon receiving and storing the preliminary data, interactive purchasing system 19 may initiate an interactive assistance process by displaying at box 13 a selectable list of purchase categories. The initial purchase categories may be very broad and general (e.g., shopping, investing, traveling, or getting services). However, the present invention does not necessarily limit in any way the specificity of initial purchase categories presented at the beginning of the interactive assistance process; the initial categories might also be specific (e.g., sports car, technology company stocks, Caribbean cruise, massages, etc.). In other words, the initial selectable list may include any suitable purchase category. Preferably, the list provides a suitable starting point for interactive assistance with the user's purchase decision-making.

After a choice of purchase category is made at box 14, interactive purchasing system 19 preferably provides step-by-step interactive assistance (boxes 13 and 14) until a final purchase selection is made or else the assistance process is aborted. For example, interactive assistance system 19 may present a series of questions intended to obtain detailed information about personal preferences or tastes (box 13). Based on the responses received (box 14), the system may then present another selectable list of narrower subcategories (box 13). After a selection is made (box 14), the system may generate yet another series of questions about the user's preferences directed to the selected subcategory and may display narrower sub-subcategories from which a choice may be made (box 13). This process may repeat itself until a final purchase selection is made. Alternatively, the assistance process may be aborted or suspended to be acted upon during a later session. At any point in the process, the process may be aborted or returned to any earlier part of the process to modify earlier selections/responses.

Preferably, this interactive question-and-answer process between interactive assistance system 19 and user 11 is designed to narrow down the purchase choices to a single or a finite number of definite purchasable items/services. The response/input at each level of the interactive assistance process may determine the system's subsequent selection of questions and/or purchase categories to be presented at the next level.

During the interactive assistance process, interactive purchasing system 19 may contact and exchange data with sellers/service providers 12 (boxes 15 and 16). The system may receive any suitable data (e.g., price, availability, product/service features, etc.) necessary for assisting the purchase decision-making from sellers/service providers. As a part of the interactive assistance process, the system may compare different items/services and different sellers/service providers based on price and/or any other suitable criteria selected by the user and/or the system.

Interactive purchasing system 19 may be capable of calculating and keeping track of purchase cost after a final purchase selection is made. The system may compare the purchase cost with the total amount of money available to the user. The system may be capable of handling and keeping track of multiple purchase selections and their cost.

The system may permit as many purchase selections as the user wishes. In one embodiment of the invention, however, the total purchase cost incurred may be limited to the total amount of money available. In this embodiment, the system may warn the user and/or prevent the user from pursuing purchase transaction(s) if the user's purchase selection(s) incurs a total purchase cost greater than the total amount of spending money available to the user.

When the interactive assistance process is complete and a final purchase decision is made (box 14), interactive purchasing system 19 may finalize purchase transactions between user 11 and sellers/service providers 12, if necessary. Interactive purchasing system 19 may relay necessary data from user 11 (e.g., information about the user, user's purchase selection, user's credit card number, etc.) to a seller/service provider 12 (boxes 14 and 16). The system may then permit the purchase transaction to take place directly with an exchange of money or a credit card charge or other suitable payment option (box 17) for selected goods/services (box 18).

Interactive purchasing system 19 may provide a summary of purchase recommendations, selections, and transactions at the end of the interactive assistance process. An interactive purchasing system may charge a service fee from user 11 and/or a commission from a seller/service provider 12.

Interactive purchasing system 19 may be comprised of the following: Interface means to present questions and selectable lists to, and receive responses, data, and selections from, user 11; communication means to exchange data with sellers/service providers 12; memory means to store information and data from user 11 and sellers/service providers 12; generating means to create questions and selectable lists of purchase categories based on input and data from user 11 and sellers/service providers 12; and calculating means to keep track of the subtotal of purchase costs associated with purchase selections made and to compare the subtotal with the total amount of spending money available.

Figure 2:
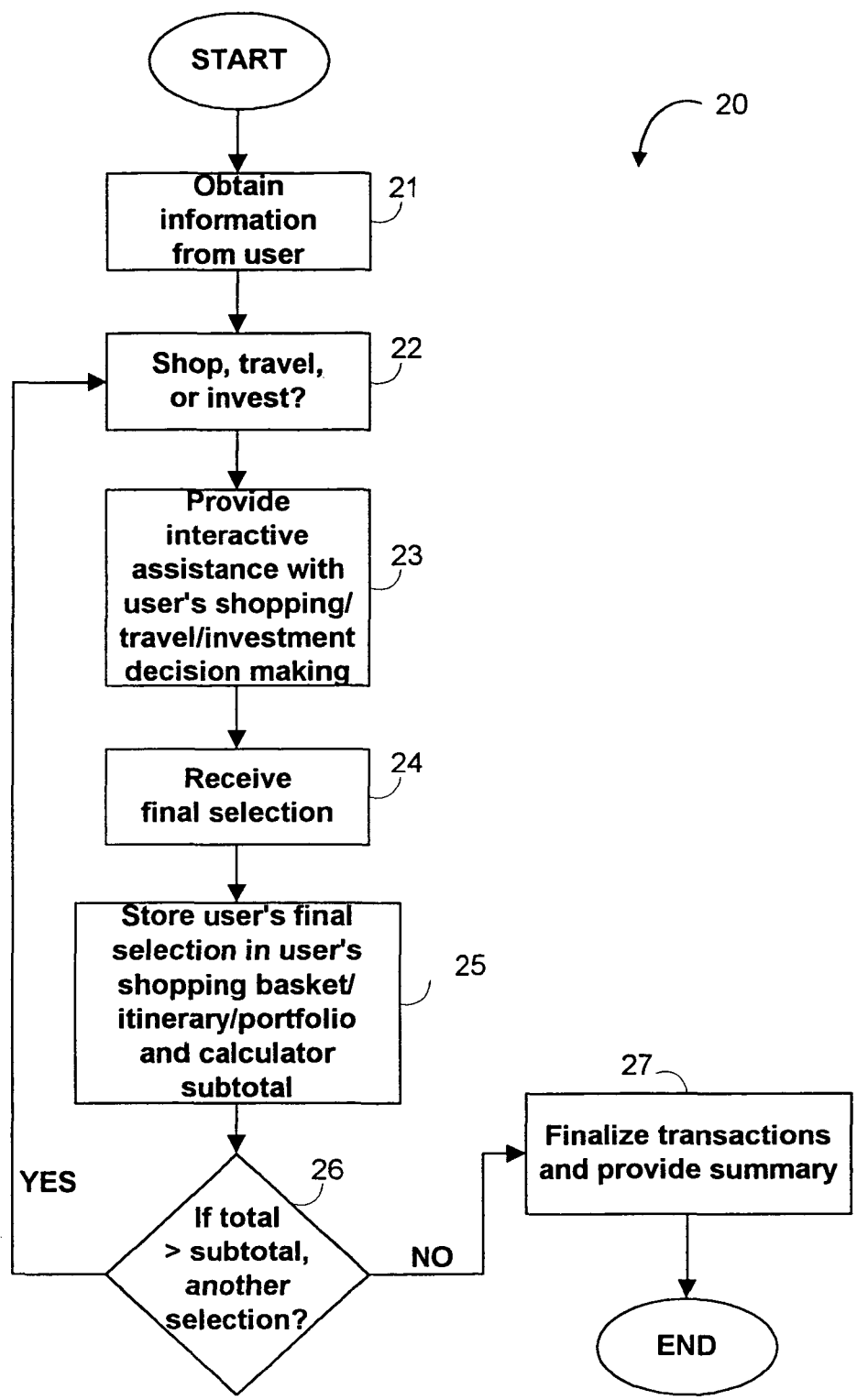
FIG. 2 is a flow diagram of a process of providing interactive assistance on purchase decision-making in accordance with one embodiment of the present invention.

Turning to FIG. 2, an example of a process 20 for performing the actions shown in boxes 13-16 of FIG. 1 is illustrated. At the beginning of a process 20, interactive purchasing system 19 may provide an interface for inputting data and/or responses. As shown at box 21, interactive purchasing system 19 may be adapted to receive a request for assistance and preliminary data. Preferably, the interactive purchasing system is adapted to receive a dollar figure of the total amount of available spending money. Other preliminary data may include any suitable information that may help guide the purchase decision-making process. Preferably, interactive purchasing system 19 stores the preliminary data for later use.

At box 22, interactive purchasing system 19 may be adapted to present a selectable list of broad purchase options such as whether to shop, travel, or invest. When a selection is made, interactive purchasing system 19 may then contact, and be ready to exchange data with, sellers/service providers 12 for that particular purchase category. In an alternative embodiment of the present invention, interactive purchasing system 19 may be permanently connected to computer servers or databases of pre-selected sellers/service providers 12.

At box 23, interactive purchasing system 19 may be adapted to provide interactive assistance based on responses to a series of questions and selectable lists of options and purchase categories presented by the system. The responses or selections at one level may determine the system's subsequent questions and selectable list of options to be presented at the next level of the assistance process. Preferably, the interactive assistance process between the system and the user is designed to help the user narrow down his or her purchase choices to a single or a finite number of definite purchasable items/services.

The interactive assistance process between interactive purchasing system 19 and user 11 may continue until a final purchase selection is made. At box 24, the system receives the final purchase selection. The system may then store the information on the final purchase selection and calculate the purchase cost associated with the selected item/service at box 25. If multiple purchase selections have been made, interactive purchasing system 19 may calculate the subtotal of all the purchase costs at box 25. The system may restrict the subtotal such that it is always less than the total amount of spending money available to the user by any suitable means.

At box 26, interactive purchasing system 19 may compare the subtotal of purchase costs calculated at box 25 with the total amount of money available to the user. If the subtotal is less than the total amount of money available to the user, the system may provide a user-selectable option to return to box 22 and make another purchase selection. If this option is selected, the system may then again go through boxes 22-25 to provide interactive assistance.

If the option to return to box 22 is not selected, then interactive purchasing system 19 may finalize purchase transactions at box 27. The system may also provide a summary of purchase recommendations, selections, and transactions at box 27.

Figure 3:
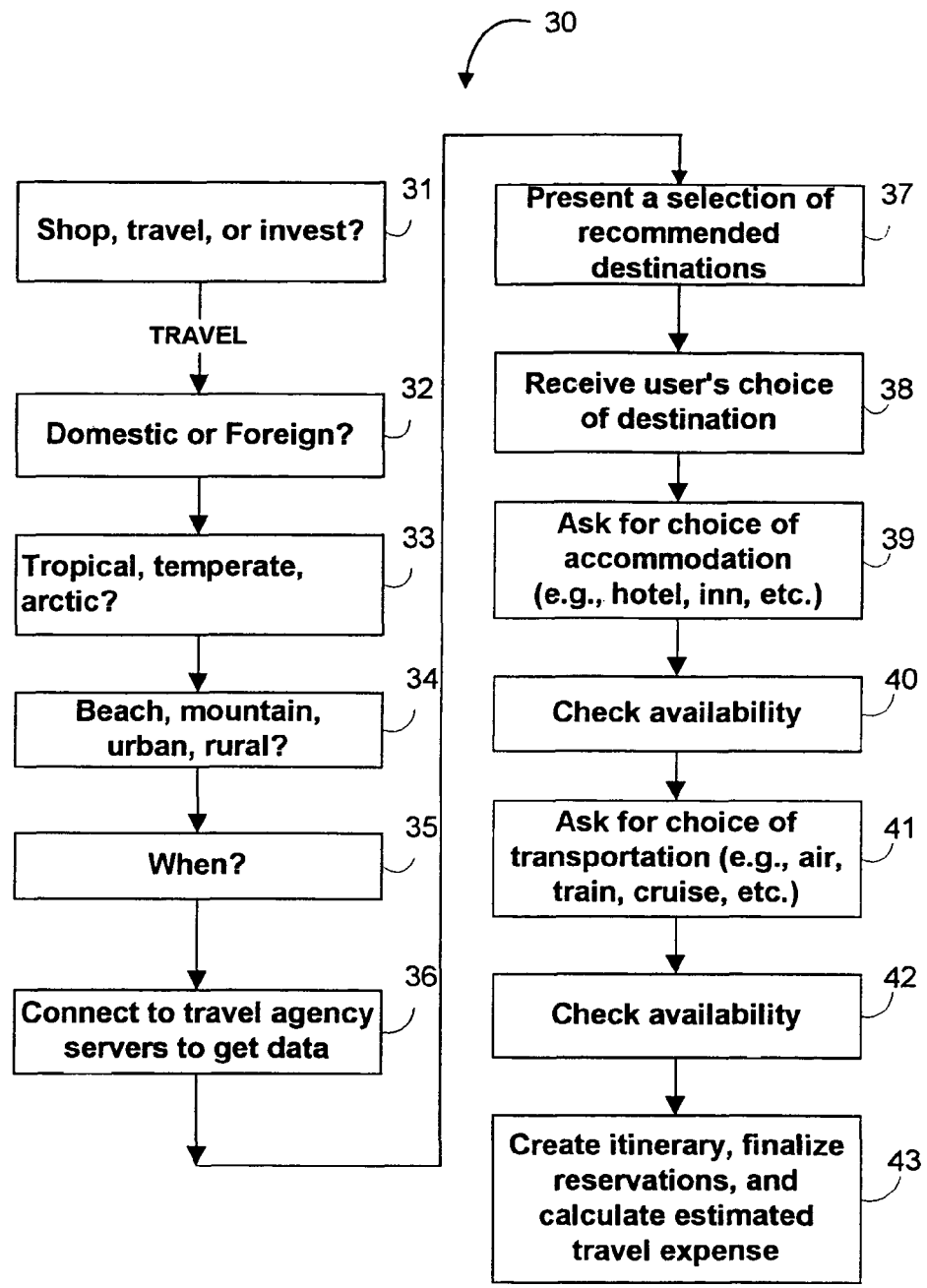
FIG. 3 is a flow diagram of steps involved in providing interactive assistance to purchase a travel package in accordance with one embodiment of the present invention.

Referring to FIG. 3, an example of a process 30 for performing boxes 22-25 of FIG. 2 is illustrated. At box 31, interactive purchasing system 19 may initiate an interactive assistance process by presenting a selectable list of purchase categories (e.g., shop, travel, or invest). In this example, the selected spending option is traveling.

At box 32, interactive purchasing system 19 may query whether domestic or foreign travel is preferred. Then, to further narrow down the choices for travel destinations, the system may ask whether a tropical, temperate, or arctic climate is preferred (box 33), whether the beach, mountain, urban, or rural areas is preferred (box 34), and/or when is the most desired time to travel (box 35).

At any suitable time during boxes 32-35, interactive purchasing system 19 may contact, and be ready to exchange data with, servers or databases of travel agents or other suitable vendors or databases 12. At box 36, interactive purchasing system 19 may send the information provided at boxes 32-35 to travel agents 12 to obtain relevant necessary data, such as possible travel destinations compatible with all of the user's personal preferences, price of travel packages, etc.

Based on the preliminary data and information and the data from travel agents 12, interactive purchasing system 19 may generate a selectable list of recommended travel destinations at box 37. At box 38, interactive purchasing system 19 receives a selection of travel destination.

Once a travel destination is selected, interactive purchasing system 19 may then query concerning a choice of accommodation (box 39) and transportation (box 41). As in its interactive assistance with respect to selection of travel destination, the system may provide similar interactive assistance with respect to selection of accommodation and transportation. The system may a series of questions relating to personal user preferences, and then present selectable lists of recommended options based on replies to the question. The recommended options for accommodation (e.g., hotel, inn, or cruise) and transportation (e.g., air, train, or rental car) may be based on the selected travel destination, other information provided, and/or data from travel agents 12.

When interactive purchasing system 19 receives the final selection of accommodation and transportation, the system may contact a selected travel agent 12 and check the availability of the selected accommodation and transportation at boxes 40 and 42. At box 43, the system may calculate the cost of the selected travel package and make certain that it is within the budget (i.e., the cost is less than the total amount of money available to the user). The system may then create a travel itinerary and finalize all transactions and reservations for the selected travel package (box 43).

In an alternative embodiment of the invention, interactive purchasing system 19 may provide an opportunity to select a desired offer price—e.g., make a bid—for a particular item or investment. For example, interactive purchasing system 19 may present a price to the user from a vendor of $200.00 for a round-trip airplane ticket from New York, N.Y., to Miami, Fla. Thereafter, interactive purchasing service 19 may provide the user with an option to counter offer the vendor or provider of service price—e.g., $160.00 for the same ticket. Interactive purchasing service 19 may then return this counter-offer to the vender where it may be accepted or met with another counter-offer—e.g., $180.00.

System and methods according to the invention may then be used to further facilitate transactions between a purchaser and a vendor with respect to individual purchases and/or investments—e.g., interactive purchasing service 19 may facilitate the purchase of securities or other investments in the manner described above for airline tickets.

Figure 5:
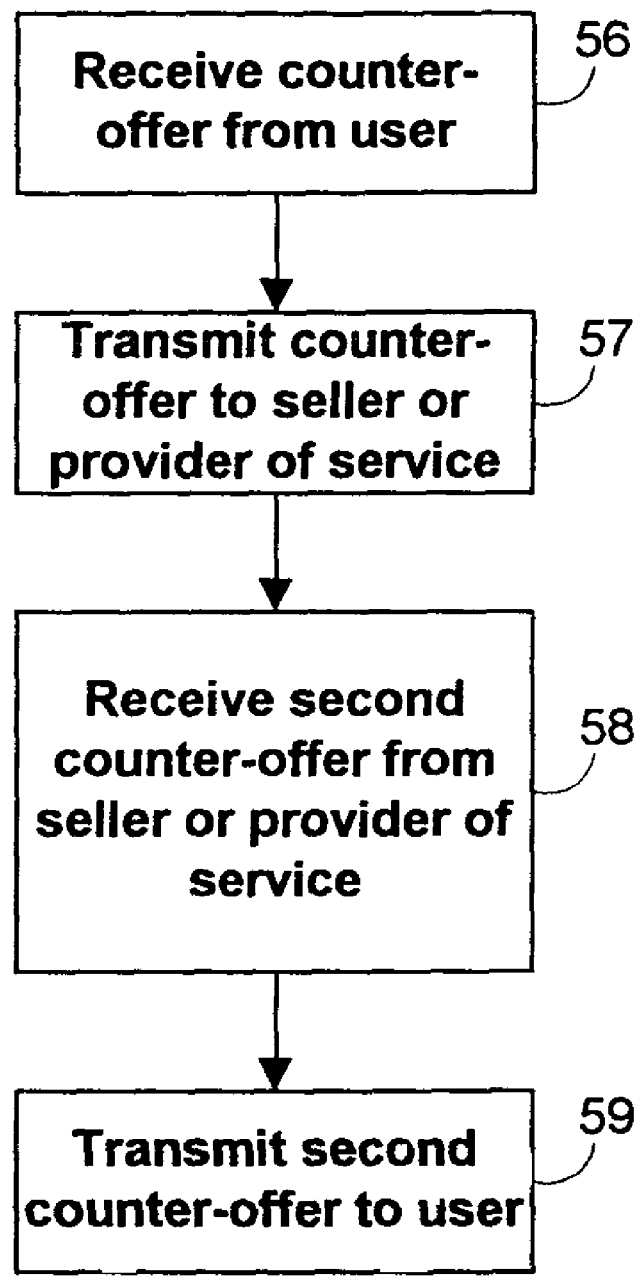
FIG. 5 is a flow diagram of a process of providing interactive assistance on purchase decision-making including a counter-offer in accordance with one embodiment of the present invention.

FIG. 5 shows a flow diagram of the embodiment described above that relates to counter offers. In one embodiment of the invention, this flow diagram may be understood to be part of box 23 shown in FIG. 2.

Box 59 shows that interactive purchasing system 19 may receive a counter-offer—e.g., from a user. Box 57 shows interactive purchasing system 19 may then transmit the counter-offer to the seller or provider of service. Box 58 shows that interactive purchasing system 19 may then receive a second counter-offer from the seller or provider of service. This second counter-offer may preferably be based on the first counter-offer. Box 59 shows that interactive purchasing system 19 may transmit or relay the second counter-offer to the user. At this point, the user may make a final selection as shown in box 24 in FIG. 2. Alternatively, further offers and counter-offers may be transmitted back and forth by interactive purchasing system 19.

Although the present invention is illustrated in FIG. 3 in the context of assisting user 11 with creating a travel itinerary along with other necessary travel arrangement, the invention is equally applicable to other purchase activities, such as shopping for merchandise items; investing in stocks, bonds, or real estate; or obtaining personal services such as a massage. Interactive purchasing system 19 and interactive assistance provided by it (boxes 13-16) may be fashioned in any suitable form, appropriate for each different purchase activity.

Figure 4:
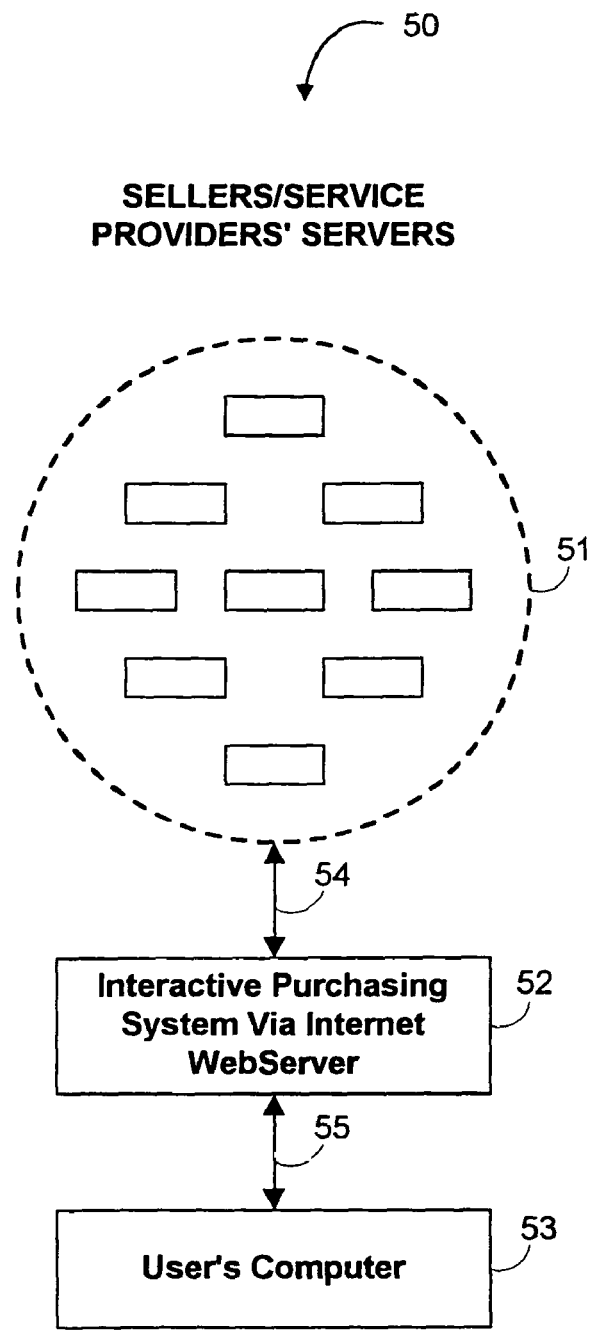
FIG. 4 is a block diagram of one embodiment of hardware that may be used to implement the present invention.

The systems and methods of the present invention may be implemented using any suitable communication network. One embodiment of such a communication network 50 is shown in FIG. 4. As illustrated, interactive purchasing system 19 may be implemented as a web site that is hosted on an Internet web page server 52, which may be any suitable server. A user's computer 53 and servers or databases of sellers/service providers 51 may be connected to Internet web page server 52, or any other suitable server, through any suitable Internet connections 54 and 55.

Internet web page server 52 may be any server suitable for providing access to a web site operating as interactive purchasing system 19. Internet web page server 52 may, for example, provide one or more web pages to user's computer 53 using one or more suitable protocols (e.g., the HyperText Transfer Protocol (HTTP) and Transmission Control Protocol/Internet Protocol (TCP/IP)). The server may also run a database engine suitable for maintaining a database of information obtained from user 11 and sellers/service providers 12. In practice, one or more functions of user's computer 53, sellers/service providers' servers 51, and the Internet web page server 52 may be integrated into a single server, or may be distributed across multiple servers.

Any suitable Internet connections 54 and 55 may be used in communication network 50 in accordance with the present invention. For example, Internet connections 54 and 55 may be comprised in whole or in part of the Internet, an intranet, a public data network, a private data network, a wireless network, a cable network, any other suitable data network or combination of networks, dial-up connections, etc.

In another embodiment of the invention, systems and methods for handling atypical influxes of wealth are provided. It is well known that atypical influxes of wealth—e.g., winning $1,000,000 in a lottery or other unexpected or unplanned for influx of wealth—may cause more harm to the recipient than good because the recipient is unprepared for this occurrence. This embodiment of the invention preferably protects a recipient of an abnormal influx of wealth from the psychological and emotional dislocation generally associated with an atypical influx of wealth.

One method according to the invention for dealing with an atypical influx of wealth includes planning for the influx before the influx actually occurs. When a typical user is in a pre-influx period, he may fill out an exemplary spending or acquisition profile with a pre-determined atypical influx according to the systems and methods described herein. For example, the pre-influx profile may be set to accommodate available spending money at an atypical value—e.g., $1,000,000. In this way, if an influx should occur, an appropriate spending plan is in place for a value that may preferably approximate an atypical influx.

Thereafter, interactive purchasing system 19 may be utilized to determine the appropriate post-influx spending plan. One particular advantage obtained by systems and methods according to the invention may be when the systems and methods are implemented by a partnership of two—e.g., a husband and wife—or even more participants. It is probable that the participants are more able to agree on an appropriate spending plan before the wealth influx than after the wealth influx. In this way, influx-induced stress can be reduced by the pre-influx approved spending plan.

Thus, systems and methods for providing interactive assistance on purchase decision-making are provided. It will be understood that the foregoing is only illustrative of the principles of the invention and that various modifications can be made by those skilled in the art without departing from the scope and spirit of the invention, which is limited only by the claims that follow.

What is claimed is:

1. A method, comprising the steps of:
    querying, using at least one computer processor, a user to provide (a) information indicating a plurality of categories of goods or services the user desires to purchase, at least two of the categories not overlapping with each other, and (b) information indicating the total amount of spending money available for purchases;
    by an iterative process performed by a computer, assisting a user to purchase multiple goods and/or services of the indicated categories, by steps of:
        obtaining from the user information about the user's preferences for a characteristic of desired goods or services of the iteration's category, wherein, for at least one of the categories, the querying comprises providing at least two user-selectable answers related to goods of the iteration's category that are indicative of responses to the query;
        providing, using at least one computer processor, the user with a recommendation of goods and/or services of the iteration's category based on the user's responses to the querying, wherein for at least some iterations, the recommendation related to the iteration's category is related to the user response to answers related to earlier iterations' categories, the recommendation reflecting the user's total spending money amount remaining after earlier iterations; and
        providing the user with an opportunity to counteroffer a price of at least one of the goods and/or services, and providing the vendor of the counteroffered good or service an opportunity to accept the user's counteroffer;
    the iterative process programmed to ensure that the total price of the goods and/or services to be purchased does not exceed the total amount of spending money;
    the price reached through counteroffer and acceptance being used in following iterations to select recommendations for goods and/or services of following iterations' categories.

2. The method of claim 1 wherein the first category includes interests related to travel.

3. The method of claim 2 wherein the second category includes interests related to accommodation.

4. The method of claim 2 wherein the second category includes interests related to shopping.

5. The method of claim 1 wherein the first category includes interests related to accommodation.

6. The method of claim 5 wherein the second category includes interests related to travel.

7. The method of claim 5 wherein the second category includes interests related to shopping.

8. The method of claim 1 wherein the first category includes interests related to shopping.

9. The method of claim 8 wherein the second category includes interests related to travel.

10. The method of claim 8 wherein the second category includes interests related to accommodation.

11. The method of claim 1 wherein the querying is provided on a graphical user interface.

12. The method of claim 1 further comprising the step of:
detecting, in at least one computer processor, that total goods and/or services of the first and second categories selected by the user exceed the user's total spending money amount available for the goods or services of the first and second categories, and in response to the detecting, returning the user to a stage of a recommendation and query process to select goods and/or services of the first and/or second categories.

13. The method of claim 1, further comprising the step of:
detecting, in at least one computer processor, that total goods and/or services of the first and second categories offered to or about to be offered to the user exceed the user's total spending money amount available for the goods or services of the first and second categories, and in response to the detecting, preventing the user from selecting goods and/or services of the first and/or second categories that would exceed the user's total spending money amount available for the goods or services of the first and second categories.

14. The method of claim 1, further comprising the step of:
accepting from the user a selection of at least two answers related to the first category from among the at least two user-selectable answers related to the first category presented in the query.

15. The method of claim 1, further comprising the step of:
detecting, in at least one computer processor, that total goods and/or services of the first and second categories selected by the user exceed the user's total spending money available for the goods or services of the first and second categories, and in response to the detecting, by computer making an offer to a vendor of the goods and/or services selected by the user to purchase the goods and/or services at a reduced price.

16. A system for querying a user of the user's interests to provide the user with recommendations, the system comprising at least one computer processor configured to:
query the user for (a) information indicating a plurality of categories of goods or services the user desires to purchase, at least two of the categories not overlapping with each other, and (b) information indicating the total amount of spending money available for purchases;
by an iterative process performed by a computer, assisting a user to purchase multiple goods and/or services of the indicated categories, by steps programmed to:
obtaining from the user information about the user's preferences for a characteristic of desired goods or services of the iteration's category, wherein, for at least one of the categories, the querying comprises providing at least two user-selectable answers related to goods of the iteration's category that are indicative of responses to the query;
provide the user with a recommendation of goods and/or services of the iteration's category based on the user's responses to the querying, wherein for at least some iterations, the recommendation related to the iteration's category is related to the user response answers related to earlier iterations' categories, the recommendation reflecting the user's total spending money amount remaining after earlier iterations; and
provide the user with an opportunity to counteroffer a price of at least one of the goods and/or services, and provide the vendor of the counteroffered good or service an opportunity to accept the user's counteroffer;
the iterative process programmed to ensure that the total price of the goods and/or services to be purchased does not exceed the total amount of spending money;
the price reached through counteroffer and acceptance being used in following iterations to select recommendations for goods and/or services of following iterations' categories.

17. The system of claim 16, the at least one computer processor being further configured to:
detect, in at least one computer processor, that total goods and/or services of the first and second categories selected by the user exceed the user's total spending money amount available for the goods or services of the first and second categories, and in response to the detecting, returning the user to a stage of a recommendation and query process to select goods and/or services of the first and/or second categories.

18. The system of claim 16, the at least one computer processor being further configured to:
detect, in at least one computer processor, that total goods and/or services of the first and second categories offered to or about to be offered to the user exceed the user's total spending money available for the goods or services of the first and second categories, and in response to the detecting, prevent the user from selection goods and/or services of the first and/or second categories that would exceed the user's total spending money amount for the goods or services of the first and second categories.

19. The system of claim 16, the at least one computer processor being further configured to:
detect, in at least one computer processor, that total goods and/or services of the first and second categories selected by the user exceed the user's total spending money amount available for the goods or services of the first and second categories, and in response to the detection, by computer making an offer to a vendor of the goods and/or services selected by the user to purchase the goods and/or services at a reduced price.

* * * * *